(12) United States Patent
Pilpel

(10) Patent No.: US 8,753,733 B2
(45) Date of Patent: Jun. 17, 2014

(54) COMPOSITE LAMINATE AND METHOD OF MANUFACTURE

(75) Inventor: Edward D. Pilpel, Avon, CT (US)

(73) Assignee: Gordon Holdings, Inc., Englewood, CO (US)

( * ) Notice: Subject to any disclaimer, the term of this patent is extended or adjusted under 35 U.S.C. 154(b) by 262 days.

(21) Appl. No.: 12/836,904

(22) Filed: Jul. 15, 2010

(65) Prior Publication Data

US 2010/0279060 A1 Nov. 4, 2010

Related U.S. Application Data

(62) Division of application No. 11/850,850, filed on Sep. 6, 2007, now abandoned.

(60) Provisional application No. 60/842,874, filed on Sep. 6, 2006.

(51) Int. Cl.
*B23B 5/12* (2006.01)
*B32B 27/04* (2006.01)
*F41H 5/04* (2006.01)

(52) U.S. Cl.
USPC .............................. 428/105; 428/98; 428/114

(58) Field of Classification Search
USPC ........................................... 428/105, 98, 114
See application file for complete search history.

(56) References Cited

U.S. PATENT DOCUMENTS 5,480,706 A * 1/1996 Li et al. .......................... 428/113
5,851,932 A 12/1998 Dickson et al.
6,183,834 B1 2/2001 Van Der Loo 2004/0092183 A1 5/2004 Geva et al.
2005/0153098 A1* 7/2005 Bhatnagar et al. ............ 428/113
2008/0044659 A1 2/2008 Pilpel

FOREIGN PATENT DOCUMENTS

EP 0417929 A1 3/1991
JP 2006188597 7/2006

OTHER PUBLICATIONS

Miles, Lowell, et al; "New Continuous-Fibre Thermoplastic Technology for Rail Car Application"; JEC Composites Magazine, vol. 26, Jul. 2006, pp. 32-33.
Davies, P., et al.; "Fracture of Glass/Polypropylene Laminates: Influence of Cooling Rate After Moulding"; Composites, vol. 25, No. 9, 1994, pp. 869-877.
"Armour Panel Employs E- and S-Glass"; Reinforcedplastics; vol. 50, No. 3, Mar. 2006, p. 18.
"Review: JEC Composites Show 2006"; Reinforcedplastics; Elsevier Ltd., vol. 50, No. 6, Jun. 2006, pp. 28-34, 37 and 39.
Villanueva, G. Reyes, et al.; "The High Velocity Impact Response of Composite and FML-Reinforced Sandwich Structures", Composites Science and Technology; vol. 64, 2004, pp. 35-54.
PCT Search Report, Application No. PCT/US2007/019506; Filing Date Sep. 6, 2007; Mailing Date Oct. 6, 2008.

* cited by examiner

*Primary Examiner* — Brent O'Hern
(74) *Attorney, Agent, or Firm* — MKG, LLC

(57) ABSTRACT

A composite laminate is made by providing at least a first composite ply and a second composite ply, each having longitudinally oriented fibers in a thermoplastic matrix. The second composite ply is disposed on, and in transverse relation to, the first composite ply. Preferably, the second ply is disposed at 90° relative to the first ply. An article can be manufactured by providing a core material and applying a reinforcing material to a portion of the core material. The reinforcing material is a reinforcing composite ply or a composite laminate as described herein. Optionally, the core material is a prepreg that may be a composite laminate.

15 Claims, 6 Drawing Sheets

COMPOSITE LAMINATE AND METHOD OF MANUFACTURE

CROSS-REFERENCE TO RELATED APPLICATIONS

This application is a divisional application of U.S. patent application Ser. No. 11/850,850, filed on Sep. 6, 2007, which claims priority to U.S. Provisional Application Ser. No. 60/842,874, filed Sep. 6, 2006, the entirety of both applications are incorporated by reference herein.

FIELD OF THE INVENTION

This invention relates to composite laminate materials and to methods of their manufacture.

BACKGROUND

In the manufacture of composite laminate panels, thermosetting resins such as phenolics, polyesters and other reactive thermosets have been used as matrix materials to make plies of composite fiber-resin material. Generally, prepregs (a common designation for pre-impregnated items of manufacture for use in subsequent manufacturing steps) incorporating plies of reinforcing fibers or fabrics wet out with reactive thermosetting resins in liquid form and stacked on top of one another are subjected to pressure and heat. The stacked material is usually subjected to a curing cycle where the heat-curable thermosetting resins are cured or set up to make the final structure. Any material that must be trimmed is scrapped since the thermosetting resins cannot be recycled back into the production process. Handling reactive (i.e., curable) liquids is problematic due to the possibility of spills, contamination and operator contact. The thermosetting resins and dust therefrom sometimes present exposure hazards to workers, and disposal of the reactive thermosetting material is problematic. When a phenol matrix material is used in a composite laminate panel such as a ballistic panel, the panel typically needs to be cured at 2100 psi for about an hour. In addition, the panel must be de-gassed to avoid the formation of voids (bubbles) in the panel. De-gassing leads to the release of volatile organic compounds (VOCs), which presents environmental concerns.

In contrast to the foregoing problems associated with thermoset matrix composites, composite laminates employing a thermoplastic matrix are easier, cleaner and simpler to handle and produce. Any waste material can be easily reworked into the process since the thermoplastic resins used do not cure or crosslink during processing, molding or heating. No special storage is required and shelf life of a thermoplastic based material is virtually indefinite, making in-process inventory of impregnated fiber sheets usable without regard to when they were manufactured. Moreover, the mechanical properties of a thermoplastic vary greatly as compared with a thermoset material. For example, thermoset materials are often hard and brittle while thermoplastics can be more pliable and subject to easier post-processing. This variation in properties coupled with the added strength resulting from the reinforcing fibers embedded in the thermoplastic matrix provide a more versatile composite material.

Composite laminates employing a thermoplastic matrix have numerous uses, including the manufacture of panels for use in armor.

Armor, or ballistic material, for vehicles and personnel is finding ever increasing application in modern times. With respect to vehicles, armor has historically taken the form of metal plates, the thickness of which varies depending on the type of projectile the armor is designed to stop. As this metal armor gets thicker, the weight of the armor increases dramatically. Making the metal armor thinner while reducing weight will likewise reduce the ability of the armor to stop the intended projectile.

Other engineered materials, such as ceramics, have been employed as armor. However, these materials are also heavy and can be prohibitively expensive. Moreover, these materials are often difficult to form and can require costly molds and dies. In aircraft where minimizing weight is critical, it is sometimes impossible to use any armoring material. This leaves personnel and equipment subject to severe injury and damage.

Many different types of armor are now available that range in resistance from those designed to protect against small caliber handguns to those designed to protect against high-powered rifles. Ballistic materials are used to fabricate portable ballistic shields, such as a ballistic clipboard for use by a police officer; to provide ballistic protection for fixed structures such as control rooms or guard stations; and to provide ballistic protection for the occupants of vehicles. Different types of ballistic materials can be used alone or in combination with one another depending on the intended threat protection.

Ballistic materials (sometimes referred to herein as "ballistic panels"), are usually tested in accordance with standards that allow for consistent and meaningful evaluation of their performance, i.e., their ability to withstand ballistic impact. Such a standard has been established by the United States Department of Justice's National Institute of Justice and is entitled "NIJ Standard for Ballistic Resistant Protective Materials" (hereinafter referred to as the "NIJ Standard"). The NIJ Standard is incorporated herein by reference. The ballistic threat posed by a bullet or other projectile depends, inter alia, on its composition, shape, caliber, mass, and impact velocity. Accordingly, the NIJ standard has classified the protection afforded by different armor grades as follows.

Type II-A (Lower Velocity 357 Magnum and 9 mm): Armor classified as Type II-A protects against a standard test round in the form of a 357 Magnum jacketed soft point, with nominal masses of 10.2 g and measured velocities of 381+/−15 meters per second. Type II-A ballistic materials also protect against 9 mm full metal jacketed rounds with nominal masses of 8 g and measured velocities of 332+/−12 meters per second.

Type II (Higher Velocity 357 Magnum; 9 mm): This armor protects against projectiles akin to 357 Magnum jacketed soft point, with nominal masses of 10.2 g and measured velocities of 425+/−15 meters per second. Type II ballistic materials also protect against 9 mm full metal jacketed rounds with nominal masses of 8 g and measured velocities of 358+/−12 meters per second.

Type III-A (44 Magnum, Submachine Gun 9 mm): This armor provides protection against most handgun threats, as well as projectiles having characteristics similar 44 Magnum, lead semiwadcutter with gas checks, having nominal masses of 15.55 g and measured velocities of 426+/−15 meters per second. Type III-A ballistic material also protects against 9 mm submachine gun rounds. These bullets are 9 mm full metal jacketed with nominal masses of 8 g and measured velocities of 426+/−15 meters per second.

Type III (High Powered Rifle): This armor protects against 7.62 mm (308 Winchester®) ammunition and most handgun threats.

Type IV (Armor-Piercing Rifle): This armor protects against 30 caliber armor piercing rounds with nominal masses of 10.8 g and measured velocities of 868+/−15 meters per second.

Other threats recognized in the art include Improvised Explosive Devices (IEDs), which may generate shrapnel that may be only a few grains in weight and may have velocities up to 5000 ft/sec.

In addition to the foregoing standards, criteria such as the percentage of projectiles allowed to penetrate a particular ballistic material are also employed in evaluating ballistic materials. One such test is the $V_{50}$ test as defined by MIL-STD-622, $V_{50}$ Ballistic Test for Armor. According to this test, the final state of a witness plate placed behind the armor panel determines the experimental outcome of the ballistic test as shown in FIG. 1A and FIG. 1B. FIGS. 1A and 1B illustrate two situations occur as a result of the ballistic test: FIG. 1A illustrates partial penetration of the test panel 10, evidenced by lack of perforation of the "witness plate" 12; and FIG. 1B illustrates complete penetration of test panel 10, evidenced by visibility of light through the witness plate 12 by a projectile or spall from the test panel 10. The area corresponding to a velocity range causing a mixture of partial and complete penetration is the Zone of Mixed Results (ZMR).

The $V_{50}$ may be defined as the average of an equal number of highest partial penetration velocities and the lowest complete penetration velocities which occur within a specified velocity spread. A 0.020 inch (0.51 mm) thick 2024-T3 sheet of aluminum is placed 6±½ inches (152±12.7 mm) behind and parallel to the target to witness complete penetrations. Normally at least two partial and two complete penetration velocities are used to compute the $V_{50}$ value. Four, six, and ten-round ballistic limits are frequently used. The maximum allowable velocity span is dependent on the armor material and test conditions. Maximum velocity spans of 60, 90, 100, and 125 feet per second (ft/s) (18, 27, 30, and 38 m/s) are frequently used.

A ballistic material commonly used as a comparative reference for $V_{50}$ tests is known in the art as HJ1, and is known to comprise woven S-glass fibers in a phenol-type thermosetting matrix material.

Another known ballistic material used as personal body armor comprises Kevlar aramid fabric that has been bonded with polyethylene in a process that is insufficient for the Kevlar fabric fibers to be encapsulated by the polyethylene.

SUMMARY

The present invention resides in one aspect in a method for making a composite laminate. The method comprises providing at least a first composite ply and a second composite ply, each of said first and second composite plies comprising longitudinally oriented fibers in a thermoplastic matrix. The second composite ply is disposed on, and in transverse relation to the first composite ply, and the plies are bonded together.

The present invention resides in another aspect in a method for making an article. The method includes providing a core material and applying a reinforcing material to a portion of the core material. The reinforcing material comprises a reinforcing composite ply that comprises longitudinally oriented fibers in a thermoplastic matrix material. The method includes binding the reinforcing material to the core material by applying heat and pressure to the reinforcing material and the core material. In a particular embodiment, the core material comprises a prepreg.

According to yet another aspect, the present invention provides a composite laminate. The composite laminate comprises a plurality of composite plies including at least a first composite ply and a second composite ply, each comprising a plurality of longitudinally oriented fibers in a thermoplastic matrix. The plurality of composite plies are bonded together and wherein the first composite ply is disposed with the fibers therein oriented in transverse relation to the fibers in the second composite ply. In a particular embodiment, the fibers in the first composite ply are different from the fibers in the second composite ply. Preferably, the fibers in the first composite ply are disposed at about 90° relative to the fibers in the second composite ply.

Yet another aspect of the invention provides an article of manufacture made by a method described herein.

DETAILED DESCRIPTION OF THE INVENTION

Figure 1A:
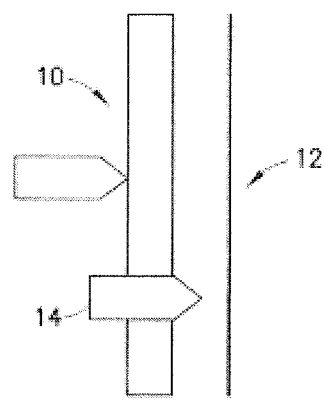
FIG. 1A is a schematic representation of partial penetration of an armor panel and an unaffected witness plate.
Figure 1B:
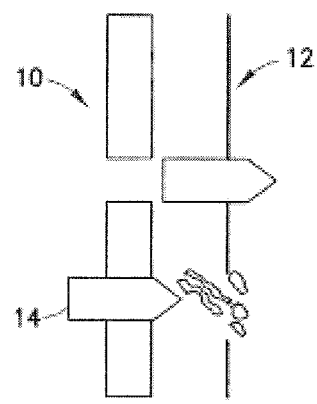
FIG. 1B is a schematic representation of complete penetration of an armor panel and an affected witness plate.
Figure 2:
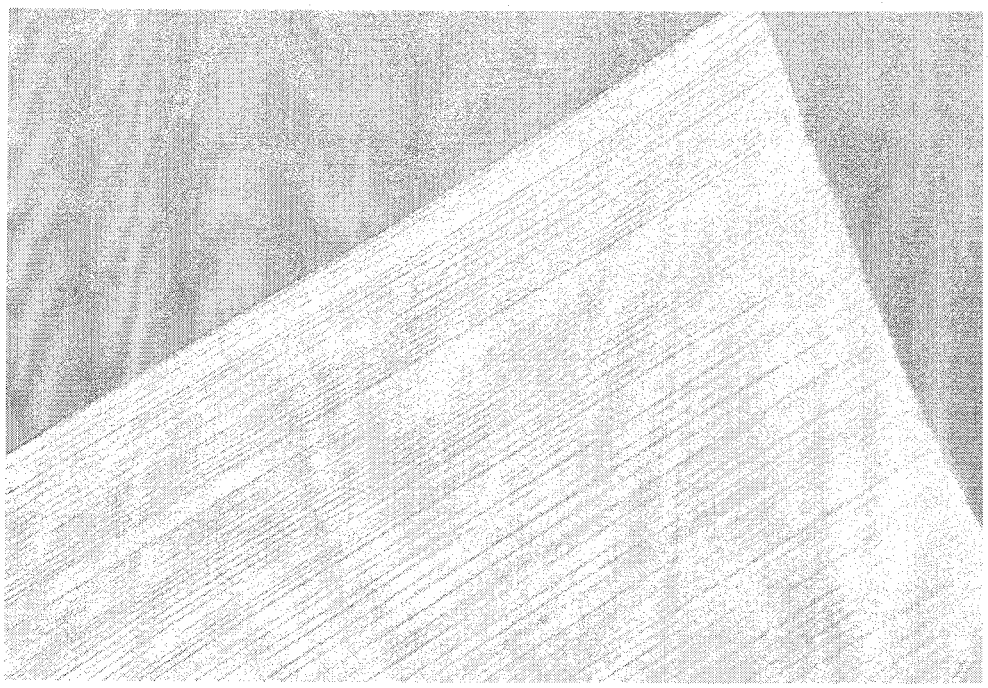
FIG. 2 is a schematic perspective view of a composite ply material as described herein.
Figure 3:
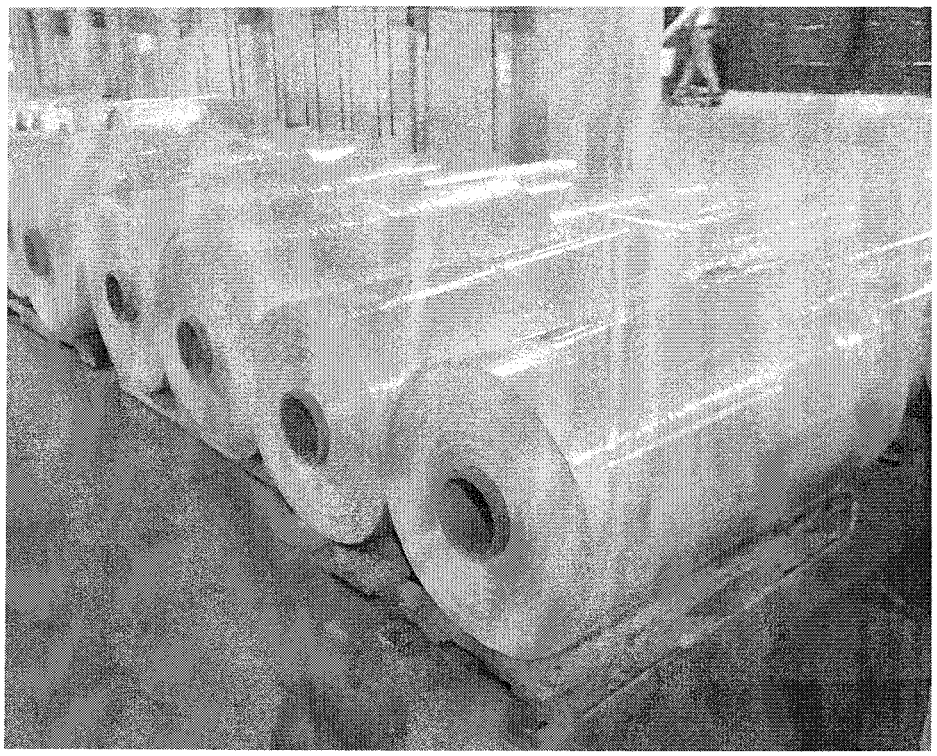
FIG. 3 is a perspective view of a plurality of rolls of composite ply material.

One aspect of the present invention is directed to a composite laminate that includes at least two composite plies. Each ply comprises a plurality of fibers that are longitudinally oriented (that is, they are aligned with each other), and preferably continuous across the ply. The plurality of fibers is impregnated with a thermoplastic matrix material to form a wetted, very low void composite ply, optionally to the substantial exclusion of thermosetting matrix material. Optionally, the fibers are encapsulated in the thermoplastic matrix material. A composite ply is sometimes referred to herein as a ply or sheet and may be characterized as "unidirectional" in reference to the longitudinal orientation of the fibers. A sample composite ply 20 is shown in FIG. 2. The composite ply 20 is a unidirectional sheet or ply that appears to be striated because of the continuous, longitudinally oriented fibers therein. Such a composite ply can be produced in a continuous process and stored in rolls such as rolls 22 as seen in FIG. 3. A composite laminate as described herein comprises at least two composite plies that are bound together with their respective fibers in transverse relation to each other.

Various types of fibers may be used in a composite ply. Example fibers include E-glass and S-glass fibers. E-glass is a low alkali borosilicate glass with good electrical and mechanical properties and good chemical resistance. This type of glass is the most widely used in fibers for reinforcing plastics. Its high resistivity makes E-glass suitable for electrical composite laminates. The designation "E" is for electrical.

S-glass is the higher strength and higher cost material relative to E-glass. S-glass is a magnesia-alumina-silicate glass for aerospace applications with high tensile strength. Originally, "S" stood for high strength. Both E-glass and S-glass are preferred fibers in this invention.

E-glass fiber may be incorporated in the composite in a wide range of fiber weights and thermoplastic polymer matrix material. The E-glass may range from about 10 to about 40 ounces per square yard (oz./sq. yd.), more preferably 19 to 30 and most preferably 21.4 to 28.4 oz./sq. yd. of reinforcement.

The quantity of S-glass or E-glass fiber in a composite ply may optionally accommodate about 40 to about 90 weight percent (wt %) thermoplastic matrix, more preferably about 50 to about 85 wt % and most preferably, about 60 to about 80 wt % thermoplastic matrix in the ply, based on the combined weight of thermoplastic matrix plus fiber.

Other fibers may also be incorporated, preferably in combination with E-glass and/or S-glass, but optionally instead of E- and/or S-glass. Such other fibers include ECR, A and C glass, as well as other glass fibers; fibers formed from quartz, magnesia alumuninosilicate, non-alkaline aluminoborosilicate, soda borosilicate, soda silicate, soda lime-aluminosilicate, lead silicate, non-alkaline lead boroalumina, non-alkaline barium boroalumina, non-alkaline zinc boroalumina, non-alkaline iron aluminosilicate, cadmium borate, alumina fibers, asbestos, boron, silicone carbide, graphite and carbon such as those derived from the carbonization of polyethylene, polyvinylalcohol, saran, aramid, polyamide, polybenzimidazole, polyoxadiazole, polyphenylene, PPR, petroleum and coal pitches (isotropic), mesophase pitch, cellulose and polyacrylonitrile, ceramic fibers, metal fibers as for example steel, aluminum metal alloys, and the like.

A preferred organic polymer fiber is formed from an aramid exemplified by Kevlar. Other preferred high performance, unidirectionally-oriented fiber bundles generally have a tensile strength greater than 7 grams per denier. These bundled high-performance fibers may be more preferably any one of, or a combination of, aramid, extended chain ultra-high molecular weight polyethylene (UHMWPE), poly [p-phenylene-2,6-benzobisoxazole] (PBO), and poly[diimidazo pyridinylene (dihydroxy) phenylene] (M5). The use of these very high tensile strength materials is particularly useful for composite ballistic armor panels and similar applications requiring very high ballistic properties.

Still other fiber types known to those skilled in the particular art to which the present invention pertains can be substituted without departing from the broader aspects of the present invention. For example, Aramid fibers such as, inter alia, those marketed under the trade names Twaron, and Technora; basalt, carbon fibers such as those marketed under the trade names Toray, Fortafil and Zoltek; Liquid Crystal Polymer (LCP), such as, but not limited to LCP marketed under the trade name Vectran. Based on the foregoing, the present invention contemplates the use of organic, inorganic and metallic fibers either alone or in combination.

The composite plies of the present invention may optionally include fibers that are continuous, chopped, random comingled and/or woven. In particular embodiments, composite plies as described herein may contain longitudinally oriented fibers to the substantial exclusion of non-longitudinally oriented fibers.

Since fibers within a composite ply are longitudinally oriented, a composite ply in a composite laminate can be disposed with the fibers in a specified relation to the fibers in one or more other composite plies.

The thermoplastic matrix material may comprise a polymer that may be a high molecular weight thermoplastic polymer, including but not limited to, polypropylene, polyethylene, nylon, PEI (polyetherimide) and copolymers, more preferably, polypropylene and polyethylene. Thermoplastic loading by weight can vary widely depending on physical property requirements of the finished part and the nature of the molding method being utilized. Various methods are known in the art by which the fibers in a ply may be impregnated with, and optionally encapsulate by, the thermoplastic matrix material, including, for example, a doctor blade process, lamination, pultrusion, extrusion, etc.

A composite ply may contain about 60 to about 10 wt % thermoplastic matrix, more preferably about 50 to about 15 wt % and most preferably, about 40 to about 20 wt % of thermoplastic matrix material, by weight of thermoplastic matrix material plus fibers.

In a preferred embodiment, a composite laminate as described herein comprises at least a first ply and a second ply that are bonded together with their respective fibers in transverse relation to each other, and the first ply contains fibers that are different from the fibers in the second ply. Thus, the composite laminate comprises at least two different kinds of fibers. In other words, fibers in at least a first composite ply are disposed in transverse relation to different fibers in an adjacent second composite ply, optionally at 90 degrees to the different fibers in the adjacent second composite ply. For ease of expression, a first composite ply and a second composite ply so disposed are sometimes described herein as being in transverse relation to each other (optionally at 90 degrees to each other) without specific mention of the fibers in each of the plies.

The phrase "different fibers" should be broadly construed to mean that the composite laminate includes least two composite plies whose fibers are made from two different materials or different grades of the same material. For example, the strike face of a ballistic panel that comprises a composite laminate could be formed using Kevlar 129 fiber while the rear or back portion of the ballistic panel could be formed using a Kevlar 129 M material, wherein the 129M material is a higher performing fiber (relative to ballistic performance) than the Kevlar 129.

Optionally, a composite laminate may also contain a composite ply disposed in parallel to an adjacent composite ply, particularly an adjacent ply that contains the same kind of fibers as in the first composite ply. The matrix material of the individual plies can be a thermoplastic polymer or a thermosetting polymer. In addition, the matrix material can vary from ply-to-ply and can be in the form of different thermoplastics, different thermosetting polymers, or combinations of thermoplastic and thermosetting polymers. Therefore, a portion of a composite laminate incorporating a first fiber type can be formed in part by stacking individual composite plies one-on-the-next in parallel relation to each other.

In a preferred embodiment of the present invention, a composite laminate comprises composite plies that contain E- and S-glass fibers respectively and that are oriented at angles of about 90° relative to one another in ply configuration.

Various methods can be employed to bond composite plies together to form a composite laminate, including stacking the composite plies one on the next and applying heat and/or pressure, or using adhesives in the form of liquids, hot melts, reactive hot melts or films, epoxies, methylacrylates and urethanes. Sonic vibration welding and solvent bonding can also be employed.

A preferred configuration for plies in a composite laminate having at least a first ply and a second ply is to have the second ply at 90° to the first ply. Other angles may also be chosen for desired properties with less than 90 degrees for the second sheet. Certain embodiments utilize a three sheet configuration wherein a first sheet is deemed to define a reference direction (i.e., zero degrees), a second sheet is disposed at a first angle (for example, a positive acute angle) relative to the first sheet (for example, about 45 degrees) and a third sheet is disposed at a second angle different from the first angle (for example, a negative acute angle) relative to the first sheet (that is, at an acute angle in an opposite angular direction from the second sheet (for example, about −45 degrees or, synonymously, at a reflex angle of about 315 degrees relative to the first sheet in the same direction as the second sheet). Thus the second and third sheets may or may not be perpendicular to each other. The thermoplastic matrix allows for easy relative motion of the fibers of adjacent plies during final molding of an article of manufacture.

Figure 4:
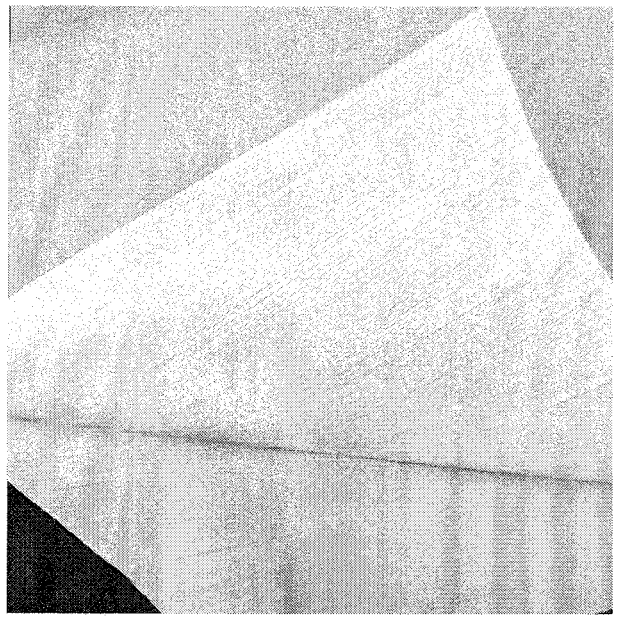
FIG. 4 is a schematic perspective view of two composite plies disposed one on the other with their respective fibers at right angles to each other.
Figure 4A:
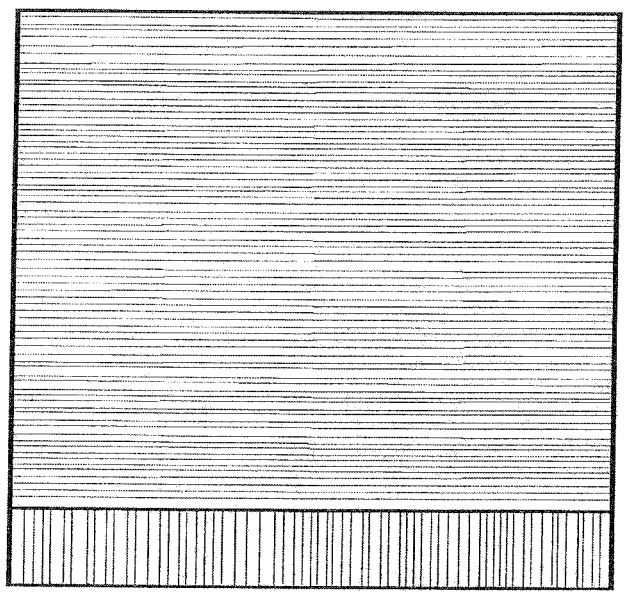
FIG. 4A is a schematic depiction of a first composite ply/planar sheet disposed on a second composite ply/planar sheet, wherein reinforcement is less than 100% of the second composite ply/planar sheet.

Another aspect of the this invention relates to the use of rolls of the unidirectionally oriented fiber-thermoplastic matrix prepreg sheeting in roll form as shown in FIG. 3 ready for use in multi-ply layups. The method of forming alternating plies of transversely-oriented fibers includes a) positioning a first sheet having longitudinal continuous reinforcing fibers oriented in a first direction embedded in a thermoplastic matrix; (b) coextensively positioning a second sheet having longitudinal continuous reinforcing fibers oriented substantially perpendicular to the fibers of the first sheet (see second sheet 24 on first sheet 20, FIG. 4); (c) repeating the layup of alternating fiber directional sheets to form a multisheet composite prepreg, a common acronym for preimpregnated item of manufacture.

A composite ply or a composite laminate as described herein can be used as a prepreg for a further manufacturing process such as thermoplastic composite processing technologies such as continuous laminating, pultrusion, compression molding, thermoforming, automated tape laying, and bladder molding.

Figure 5:
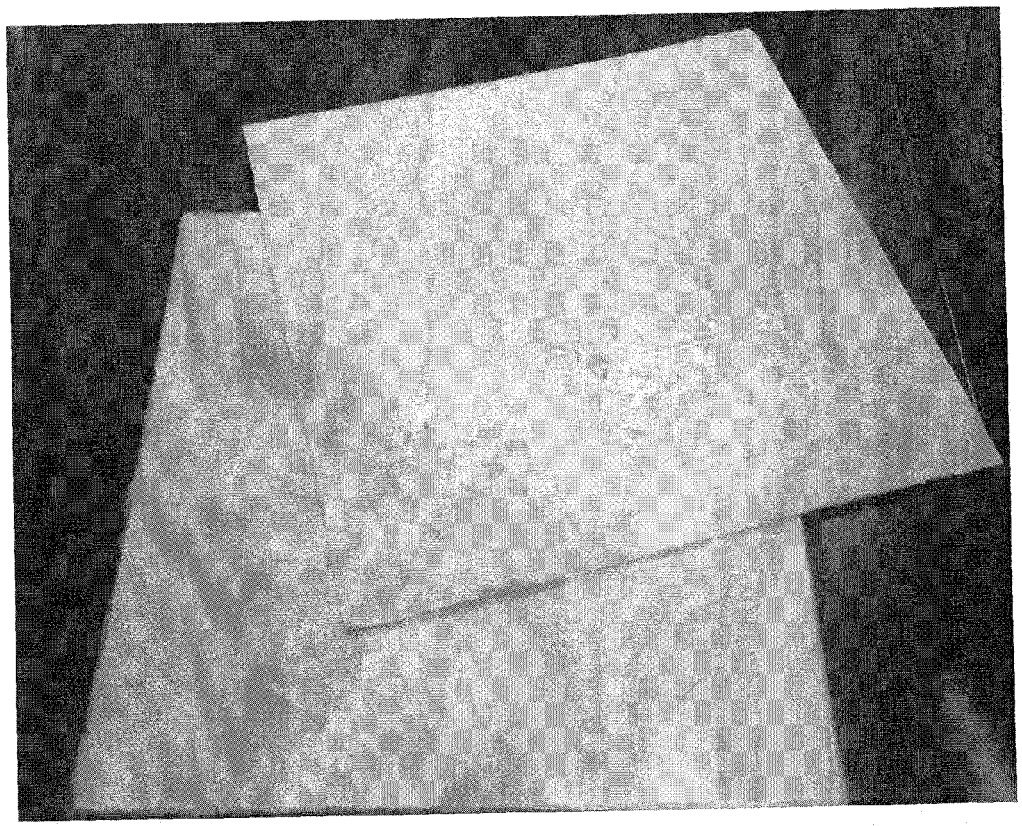
FIG. 5 is a perspective view of two prepregs as described herein.
Figure 6:
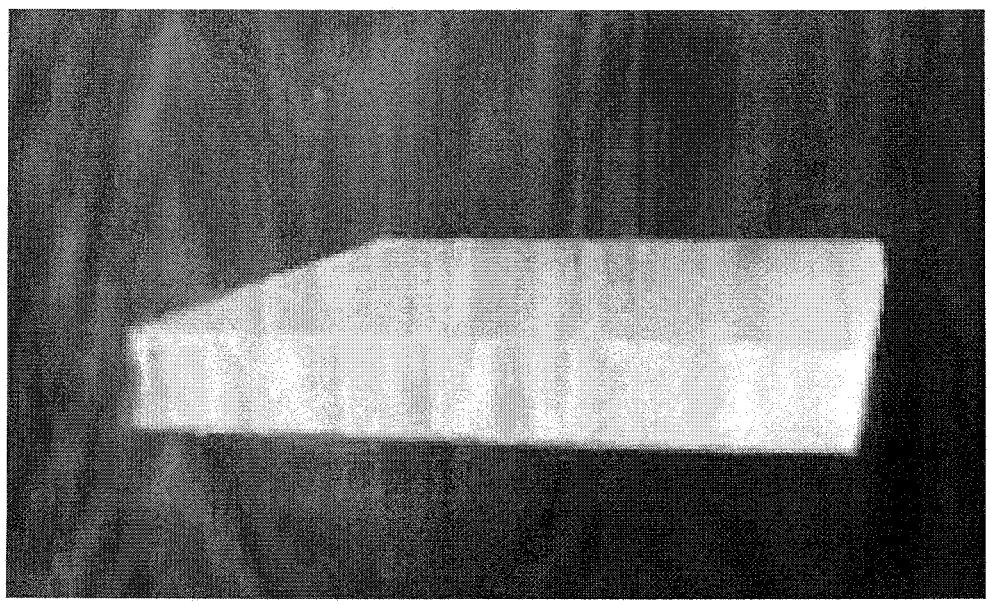
FIG. 6 is a perspective view of another prepreg as described herein.

FIG. 5 shows two prepregs 26, 28 of stacked composite plies that comprise Kevlar fiber in a thermoplastic matrix and which are suitable for final forming into a finished article. FIG. 6 shows a prepreg 30 with more composite plies than in prepreg 26 or 28 consolidated into a package ready for forming into a product.

Another aspect of the invention is a method of preparing a prepreg stack and for making a final article of manufacture therefrom, optionally performed as a continuous process comprising (a) stacking a plurality of plies of thermoplastic impregnated, oriented continuous fibers sheets or tapes (where fibers of adjacent plies alternate at 0 degrees and 90 degrees) to obtain the desired thickness of prepreg package; (b) heat staking as required for dimensional stability and easy handling; (c) heating the press until the center of prepreg package is at a desired prepreg formation (i.e., consolidation) temperature to form the prepreg; (d) setting the prepeg to a mold-ready temperature under pressure, i.e., to a temperature at which the prepreg is ready for the application of pressure and heat in a molding process, for example, about 125° F. for polypropylene (other temperatures are selected for other thermoplastic matrix materials), optionally by cooling from the consolidation temperature of (c); (e) applying molding pressure sufficient to deform the matrix material in the prepreg; (f) heating until center of package attains a molding temperature, for example, heat to about 340° F.; (g) pressing at sufficient pressure to form the article, for example, 100 psi; (h) cooling the article in the mold, for example, to 125° F.; and (i) demolding the article (i.e., removing the article from the mold).

To mold polyethylene matrix materials typical conditions vary as follows: (a) heat center of package to a molding temperature of 250° F.; (b) press at 100 psi; (c) cool to 125° F.

Yet another aspect of the invention relates to in-mold augmentation, in which a reinforcement ply is provided to certain parts of a prepreg just prior to the final molding steps for the production of a molded product.

One aspect of the invention is a method of making a unidirectional prepreg that comprises a composite ply, by: (a) embedding a multiplicity of longitudinally-oriented, substantially parallel, continuous reinforcing fibers in a thermoplastic matrix to form a planar sheet of unidirectionally oriented reinforcing fiber in essentially any width or length desired. Typically, a prepreg comprises a plurality of composite plies that are at least partially adhered and/or cohered together by the application of pressure and heat.

Such prepregs can be used in a variety of subsequent manufacturing steps which ultimately create a finished article of manufacture.

Another aspect of the invention is a method of making thermoplastic parts comprising: stacking unidirectional composite plies in alternating transverse orientation using the appropriate fiber type and denier to form a composite laminate to serve as a prepreg, and reinforcing selected portions of the prepreg with one or more additional reinforcement plies to provide a reinforced prepreg that meets the structural demands of a particular application. The reinforcement plies cover and adhere to only the selected portion of the unreinforced prepreg and that may be provided in the form of a sheet, a tape, or any other convenient form to provide localized reinforcement of the prepreg. The reinforced prepreg is then heated and pressed until it becomes formable and adjacent composite plies are adequately consolidated. In an alternative embodiment, the reinforcement layer is positioned on the prepreg after the plies of the prepreg are consolidated. Either in the same step as consolidation or in a separate manufacturing step, the consolidated stack is heated (as necessary), shaped using pressure and appropriate molding techniques, and cooled to solidify the final part and retain the final desired configuration of the part. Suitable processes for heating and pressing a prepreg or a reinforced prepreg include, for example, thermoplastic composite processing technologies such as continuous laminating, pultrusion, compression molding, thermoforming, automated tape laying, and bladder molding.

The addition of localized reinforcements works particularly well in processes such as vacuum forming. The reinforcement is added in much the same way molders currently add in-mold colors and graphics. Other processes, such as compression, transfer and blow molding may also benefit from this aspect of the invention. This in-mold augmentation of the prepreg is preferably done with a reinforcement layer that comprises a unidirectional single ply but may also be accomplished with a reinforcement layer that comprises a composite laminate as described herein, to effect localized reinforcement and strength as desired.

Providing a reinforcement ply gives manufacturers a new way to add impact resistance and stiffness to their products without adding a lot of weight, which is a substantial advantage in many applications. This unique ability to produce lighter weight parts is especially attractive to aircraft, automotive, construction and infrastructure applications. The faster molding cycles and reduced waste are attractive in all these applications.

Combined with a core material, such as a prepreg, in a manufacturing process requiring no adhesive, the reinforcement adds lightweight strength, stiffness and impact resistance to the core material, including traditional core materials such as polypropylene honeycomb, foam, wood and other advanced core materials. Potential applications include the manufacture of cargo containers, load-bearing floors and side panels of recreational vehicles, and walls for rail cars and trucks.

One advantage of the invention is that production scrap from a composite ply or a composite laminate that contains only a thermoplastic matrix material can be 100% re-used and the final part itself can also be 100% recycled as part of a sustainable "green," environmentally-responsible, materials management program.

The invention employs distinctive materials and process technologies that combine structural fibers within an energy-dissipating matrix of thermoplastic polymer. This results in a reinforced thermoplastic composite that has many advantages compared to traditional, more brittle thermosetting polymer composites currently used in ballistic panels.

Some embodiments of the invention provide one or more of the following advantages: (1) multiple plies of unidirectional fiber sheets or tapes can be stacked using the appropriate fiber, reinforcing content and fiber orientation to meet the structural demands of each application; (2) the stacked material charge is then heated until formable and consolidated, then shaped and cooled to retain the final configuration of the part; (3) production scrap can be 100% re-used; (4) the final part itself can also be 100% recycled as part of a sustainable "green," environmentally-responsible materials management program; (5) the product is a fully wetted, very low void, continuous fiber-reinforced thermoplastic produced in the form of tapes, tows and rods for utility in most applications. These advantages derive from novel materials and process technologies that combine continuous structural fibers with an energy-dissipating matrix of thermoplastic polymer.

This invention can provide a reinforced thermoplastic composite with the many foregoing advantages compared to traditional, more brittle thermosetting polymer composites in such applications as ballistic panels. Composite laminated panels can be also made with several types of wood including balsa, fiberboard, luan, oriented strand board and particle board using the novel reinforcement provided by the alternated plies of perpendicular reinforcement embedded in the thermoplastic matrix material.

This prepreg process can make wide continuous webs of alternating orientation material or may provide tapes of narrower width.

In some embodiments, composite laminates are used as ballistic materials that can be used to make many different types of armor that range in resistance from those designed to protect against small caliber handguns to those designed to protect against high powered rifles. Ballistic materials are used to fabricate panels of various sizes and ballistic strengths to provide ballistic products such as portable ballistic shields, for example, a ballistic clipboard for use by a police officer; to provide ballistic protection for fixed structures such as control rooms or guard stations; and to provide ballistic protection for the occupants of vehicles. Different types of ballistic materials can be used alone or in combination with one another depending on the intended threat protection.

The ballistic panel of the present invention was initially contemplated as a way to lower the cost of ballistic panels composed entirely of composite materials incorporating thermosetting matrices and high performance, expensive fibers. By employing thermoplastic matrices and one or more plies of lower performing, less expensive fiber, the manufacturing and material costs of the ballistic panels was significantly reduced. It was originally expected that there would be some loss in performance, however as long as the material performed within specified parameters it would still be acceptable. Using the materials and methods described herein, ballistic materials and panel that meet the various NU criteria discussed above can be produced without undue experimentation.

In specific embodiments, composite laminates as described herein can be used as ballistic panels by employing composite plies that contain continuous E-glass and S-glass fibers encapsulated in a thermoplastic matrix. The E-glass and S-glass portions of the panels have adjacent plies of the fiber sheets oriented perpendicularly to each other. Panels made of this material have the E-glass portion of the composite forming the strike-face and comprising a portion of the thickness defined by the ballistic panel and the s-glass portion of the composite forming the remainder of the panel. Depending on the qualification criteria for a particular panel, the thickness of the panel and the relative thicknesses of the E-glass and S-glass portions of the panel can vary.

In general, the thermoplastic matrix material fully encapsulates and wets the E- and S-glass fibers. However, while E- and S-glass fibers have been described, the present invention is not limited in this regard. Other fiber types known to those skilled in the particular art to which the present invention pertains can be substituted without departing from the broader aspects of the present invention.

In addition, while the ballistic panel of the present invention has been described as comprising essentially two plies, the present invention is not limited in this regard as multiple plies can be employed, the composition of which will vary depending on the intended application. Moreover, not every ply need be a composite material. For example, the ballistic material could be composed of three plies one of which is pure polymer e.g., an E-glass composite strike face, an S-glass composite middle ply and a UHMWPE rear ply. The number of plies of material and their composition can be varied depending on the application.

In addition to composite and polymeric plies forming portions of the ballistic material, other types of materials can also be employed. For example, metals or ceramics can be used to form the strike faces of the ballistic panel. These materials can also be employed as internal plies or the rear portion of the ballistic panel.

Depending on the composition of the ballistic panel, different methods can be employed to bond the various plies together. These methods include using adhesives in the form of liquids, hot melts, reactive hot melts or films, epoxies, methylacrylates and urethanes. Sonic vibration welding and solvent bonding can also be employed.

Once fabricated, the ballistic panel of the present invention may be encapsulated by another composite, an elastomer, a metal housing etc. to protect against ultraviolet, moisture or other environmental influences. In addition, additives can be incorporated into the matrix material(s) for such things as fire resistance, smoke and toxicity resistance, and for cosmetic reasons. Moreover, metallic wires or wire mesh can be incorporated into individual plies or in the interfaces between plies.

As such, a ballistic panel comprising a ply of less expensive lower performing E-Glass fibers in a thermoplastic matrix and a ply of more expensive, higher performing S-Glass fibers also in a thermoplastic matrix was fabricated.

In one embodiment, the present invention encompasses segregated hybrid composite ballistic panels. A hybrid composite ballistic panel comprises at least two different kinds of fibers are disposed, e.g., encapsulated, in at least one matrix material. The term "nonhybrid," as used herein, refers to panels or other materials that contain only a single kind of fiber. Segregated hybrid composite ballistic panels (or, simply, segregated hybrid panels) comprise lower-performing fibers concentrated in a portion (or stratum) of the panel at, or adjacent to, the strike face, referred to herein as the "strike face portion" of the panel. The remainder of the segregated hybrid panel comprises a "support portion," which is adjacent the strike face portion and which defines the back face of the panel; the higher-performing fibers are concentrated in the support portion of the panel. The support portion of a segmented hybrid panel may comprise a "back face stratum" that defines the back face of the panel and an internal stratum between the back face stratum and the strike face portion. Accordingly, in some embodiments, at least one of the back face stratum and the internal stratum of the panel contains the higher-performing fibers. Optionally, a panel may comprise more than two kinds of fibers. In such case, it is preferred, but not required, that the fibers be used in strata arranged from strike face to back face in order of increasing performance.

One example of ballistic panel is a panel that has a strike-face portion principally comprising E-glass fibers as the lower-performing fibers and a support portion comprising S-glass fibers as the higher-performing fibers. Depending on the performance criteria for a particular panel, the thickness of the panel and the relative thicknesses of the E-glass and S-glass portions of the panel can vary. Preferably, the S-glass plies and the E-glass plies are about equal in their weight contribution to the panel. In specific embodiments, the E-glass fibers may comply with ASTM D578-98, paragraph 4.2.2, and may have a roving yield of about 250-675 yards/pound (yd/lb.), or a roving tex of about 735-1985 grams/kilometer (g/km). The S-glass fibers may comply with ASTM C 162-90 and/or ASM 3832B, and may comprise filaments of a diameter of about 9 micrometers, have a roving tex of 675-1600 g/km or a yield of about 310-735 yards/lb.

Formation of a panel from plies comprising thermoplastic matrix materials to the substantial exclusion of thermosetting matrix materials can be achieved at lower pressure and for shorter periods than are needed for a thermosetting matrix material to cure. In addition, panels comprised of plies containing thermoplastic matrix material require no degassing and generate little or no VOCs. Optionally, metals or ceramics or other materials can be added to a composite panel as described herein.

The terms "first," "second," and the like, herein do not denote any order, quantity, or importance, but rather are used to distinguish one element from another. In addition, the terms "a" and "an" herein do not denote a limitation of quantity, but rather denote the presence of at least one of the referenced item. When a numerical phrase includes the term "about" the phrase is intended to include, but not require, the precise numerical value stated in the phrase.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

It is to be understood that the present invention is by no means limited to the particular construction herein disclosed and/or shown in the drawings, but also comprises any modifications or equivalents within the scope of the disclosure.

What is claimed is:

1. A composite laminate comprising:
  a plurality of composite plies including at least a first composite ply and a second composite ply, each composite ply comprising a plurality of longitudinally oriented fibers in a thermoplastic matrix;
  wherein the plurality of composite plies are bonded together and wherein the first composite ply is disposed with the fibers therein oriented in transverse relation to the fibers in the second composite ply; and
  a reinforcement ply provided to only a selected, localized portion of the second composite ply to provide localized reinforcement of the second composite ply, wherein the localized reinforcement is less than 100% of the second composite ply.

2. The composite laminate of claim 1 wherein the fibers in the first composite ply comprise one or more of a different material than the fibers in the second composite ply and a different grade of material from the fibers in the second composite ply.

3. The composite laminate of claim 2 wherein the fibers in the first composite ply are disposed at about 90° relative to the fibers in the second composite ply.

4. The composite laminate of claim 1 wherein the fibers in the first composite ply are disposed at about 90° relative to the fibers in the second composite ply.

5. The composite laminate of claim 1 configured to be a ballistic panel that protects against a standard test round in the form of a 357 Magnum jacketed soft point, with nominal masses of 10.2 g and measured velocities of 381+/−15 meters per second.

6. The composite laminate of claim 1 configured to be a ballistic panel that protects against a standard test round in the form of a 9 mm full metal jacketed rounds with nominal masses of 8 g and measured velocities of 332+/−12 meters per second.

7. The composite laminate of claim 1 configured to be a ballistic panel that protects against 357 Magnum jacketed soft point projectiles, with nominal masses of 10.2 g and measured velocities of 425+/−15 meters per second.

8. The composite laminate of claim 1 configured to be a ballistic panel that protects against 9 mm full metal jacketed rounds with nominal masses of 8 g and measured velocities of 358+/−12 meters per second.

9. The composite laminate of claim 1 configured to be a ballistic panel that protects against projectiles from a 44 Magnum having nominal masses of 15.55 g and measured velocities of 426+/−15 meters per second.

10. The composite laminate of claim 1 configured to be a ballistic panel that protects against projectiles from a 9 mm full metal jacketed with nominal masses of 8 g and measured velocities of 426+/−15 meters per second.

11. The composite laminate of claim 1 configured to be a ballistic panel that protects against 7.62 mm projectiles from a 308 Winchester® gun.

12. The composite laminate of claim 1 configured to be a ballistic panel that protects against 30 caliber armor piercing rounds with nominal masses of 10.8 g and measured velocities of 868+/−15 meters per second.

13. The composite laminate of claim 1 configured to be a ballistic panel that protects against Improvised Explosive Devices which generate shrapnel having velocities up to 5000 ft/sec.

14. The composite laminate of claim 1 configured to be a ballistic panel that protects against an average of an equal number of highest partial penetration velocities and lowest complete penetration velocities which occur within a maximum velocity span of at least one of 60, 90, 100, and 125 feet per second feet per second.

15. A composite laminate comprising:
  a plurality of composite plies including at least a first composite ply and a second composite ply, each composite ply comprising a plurality of longitudinally oriented fibers in a thermoplastic matrix;

wherein the plurality of composite plies are bonded together to form a planar sheet and wherein the first composite ply is disposed with the fibers therein oriented in transverse relation to the fibers in the second composite ply; and a reinforcement ply provided to only a selected, localized portion of the planar sheet to provide localized reinforcement of the planar sheet, wherein the localized reinforcement is less than 100% of the planar sheet.

\* \* \* \* \*